United States Patent Office 2,899,322
Patented Aug. 11, 1959

2,899,322

OPTICAL GLASS

Heinz Brömer, Hermannstein, and Norbert Meinert, Wetzlar, Germany, assignors to Ernst Leitz, G.m.b.H., Wetzlar (Lahn), Germany, a corporation of Germany No Drawing. Application June 20, 1957
Serial No. 667,023

Claims priority, application Germany July 7, 1956

3 Claims. (Cl. 106—47)

Optical glass has been known which consisted essentially of boron trioxide, lanthanum oxide as well as tantalum and/or niobium oxide. To these glasses up to 20 percent of zirconium oxide as well as zinc and/or cadmium oxide were sometimes added. Thereby the percentage by weight of lanthanum, zinc and cadmium oxide, respectively will be greater than 55–0.84 Z, in which Z is the percent by weight of zirconium, tantalum and/or niobium.

These glasses exhibit, however, an undesirably high absorption for optical purposes in the ultraviolet and blue range of the spectrum.

We have now found that glasses with very slight coloring and with very high refractive index and very slight dispersion can be formed by the melting together of oxides of the above mentioned elements, if in the constituents, the mol ratio of boric oxide to lanthanum oxide lies between 2.5 and 3.6, the mol ratio of the oxide of the bi-valent metal oxides to lanthanum oxide lies between 0.35 and 0.9 as well as that the molecular ratio of the sum of the oxides of the four and five valent metals to lanthanum oxide lies between 0.2 and 0.45 whereby, moreover, the sum of the mentioned ratio numbers lies between 3.3 and 4.9.

The two- and three-valence elements are preferably added to the melt constituents as borates.

The percentages by weight of the several oxides should preferably amount to the following:

|  | Percent by weight |
|---|---|
| $B_2O_3$ | 27.0–33.0 |
| CdO | 7.5–15 |
| $La_2O_3$ | 42.0–52.0 |
| $ZrO_2$ | 3.0–6.5 |
| $Ta_2O_5$ | 3.5–7.0 |

Some examples of glasses according to the invention are given in the following tables. In the melt constituents of the glasses of Table 1 only oxides are listed, while in Table 2 borates are listed as well as oxides.

Table 1

| Melt No. | $B_2O_3$ | $La_2O_3$ | CdO | $ZrO_2$ | $Ta_2O_5$ | $n_e$ | $v$ |
|---|---|---|---|---|---|---|---|
| Le 9 | 32.70 | 42.60 | 14.90 | 5.70 | 4.10 | 1.7728 | 48.3 |
| Le 21 | 32.73 | 45.50 | 14.90 | 3.54 | 4.13 | 1.7741 | 48.8 |
| Le 26 | 32.54 | 84.73 | 9.30 | 5.23 | 4.20 | 1.7759 | 48.8 |
| Le 29 | 31.10 | 45.60 | 11.60 | 5.60 | 6.10 | 1.7850 | 47.7 |
| Le 17 | 29.50 | 49.00 | 13.50 | 4.00 | 4.00 | 1.7925 | 47.8 |
| Le 11 | 29.50 | 48.20 | 13.50 | 5.10 | 3.70 | 1.7950 | 47.3 |
| Le 12 | 28.40 | 50.10 | 13.00 | 4.90 | 3.60 | 1.8020 | 47.1 |

Table 2

| Melt No. | $B_2O_3$ | $La_2(BO_3)_2$ | $Cd(BO_2)_2$ | $ZrO_2$ | $Ta_2O_5$ | $n_e$ | $v$ |
|---|---|---|---|---|---|---|---|
| T 21 | 17.00 | 60.40 | 12.00 | 5.20 | 5.40 | 1.7798 | 48.7 |
| Le 10 | 14.30 | 53.70 | 22.40 | 5.60 | 4.00 | 1.7806 | 48.1 |
| Le 15 | 14.60 | 58.00 | 18.10 | 4.50 | 4.80 | 1.7900 | 47.7 |
| Le 27 | 15.00 | 61.60 | 12.10 | 5.40 | 5.90 | 1.7930 | 47.9 |
| Le 39 | 12.40 | 61.70 | 15.50 | 6.10 | 4.30 | 1.7972 | 47.3 |
| Le 13 | 11.60 | 57.40 | 20.50 | 5.10 | 5.40 | 1.7986 | 47.2 |
| Le 40 | 11.30 | 62.10 | 16.10 | 6.20 | 4.40 | 1.8034 | 46.9 |
| Le 14 | 10.10 | 58.80 | 19.40 | 4.80 | 6.90 | 1.8102 | 46.2 |

The approximate composition of the oxides of Table 2 is as follows:

| Melt No. | $B_2O_3$ | $La_2O_3$ | CdO | $ZrO_2$ | $Ta_2O_5$ |
|---|---|---|---|---|---|
| T 21 | 31.9 | 49.7 | 7.8 | 5.2 | 5.4 |
| Le 10 | 31.6 | 44.3 | 14.5 | 5.6 | 4.0 |
| Le 15 | 30.9 | 48.1 | 11.7 | 4.5 | 4.8 |
| Le 27 | 30.3 | 51.1 | 8.0 | 5.4 | 5.9 |
| Le 39 | 28.9 | 50.7 | 10.0 | 6.1 | 4.3 |
| Le 13 | 29.0 | 47.2 | 13.3 | 5.1 | 5.4 |
| Le 40 | 27.8 | 51.2 | 10.4 | 6.2 | 4.4 |
| Le 14 | 27.3 | 48.5 | 12.5 | 4.8 | 6.9 |

An addition of glass stabilizing substances, such as about 5 percent by weight of silica is provided for within the invention.

As is shown in the optical values given in the above examples, the values plotted in a $N_e$–$v$ graph lie collectively above a straight line drawn according to the equation $v=159-62.5\ N_e$ in which the refractive indices are greater than $N_e=1.77$.

The constituents of each of the several melts in finely divided or powdered form are mixed together and heated to the melting temperature. The mixture may be melted in a crucible of a material, such as platinum, that does not dissolve in the melt. The examples consisted of a charge of about 1000 grams. The raw materials of the melt fused at a temperature of 1200° C. The melting temperature reached 1300° C. and the melting time two hours. The glass was cast or poured at a temperature of 950° C. The poured glass was then permitted to cool slowly to atmospheric temperature in the customary way.

Having described our invention, what we claim is:

1. Color poor optical glass which consists essentially of boron trioxide, lanthanum oxide, zirconium oxide, tantalum oxide, together with at least one oxide selected from the group consisting of zinc and cadmium in which in the melting charge the mol ratio of boron trioxide to lanthanum oxide is between 2.5 and 3.6, the mol ratio of the oxide of the bi-valent element to lanthanum oxide is between 0.36 and 0.9, the mol ratio of the sum of the oxides of the four and five valent elements to lanthanum oxide is between 0.2 and 0.45 and in which the sum of the given ratios is between 3.3 and 4.9.

2. The color poor optical glass of claim 1 in which the oxides of the group consisting of zinc and cadmium and tri-valent elements are incorporated in the charge as borates.

3. Color poor optical glass of claim 1 in which the approximate percentages of the ingredients as oxides lie within the following limits $B_2O_3$ between 27.00 and 33.00 percent by weight
CdO between 7.5 and 15.00 percent by weight
$La_2O_3$ between 42.00 and 52.00 percent by weight
$ZrO_2$ between 3.00 and 6.50 percent by weight
$Ta_2O_5$ between 3.50 and 7.00 percent by weight References Cited in the file of this patent

UNITED STATES PATENTS

| 2,430,540 | Sun et al. | Nov. 11, 1947 |
| 2,434,149 | De Paolis | Jan. 6, 1948 |
| 2,466,508 | Sun et al. | Apr. 5, 1949 |
| 2,678,281 | Geffcken et al. | May 11, 1954 |
| 2,787,554 | De Paolis | Apr. 2, 1957 |

OTHER REFERENCES

Hackh's Chem. Dictionary, 3d edition, page 632.